May 22, 1945.  A. F. LARABEE  2,376,494
TIRE MANUFACTURE
Filed Dec. 8, 1941　　2 Sheets-Sheet 1
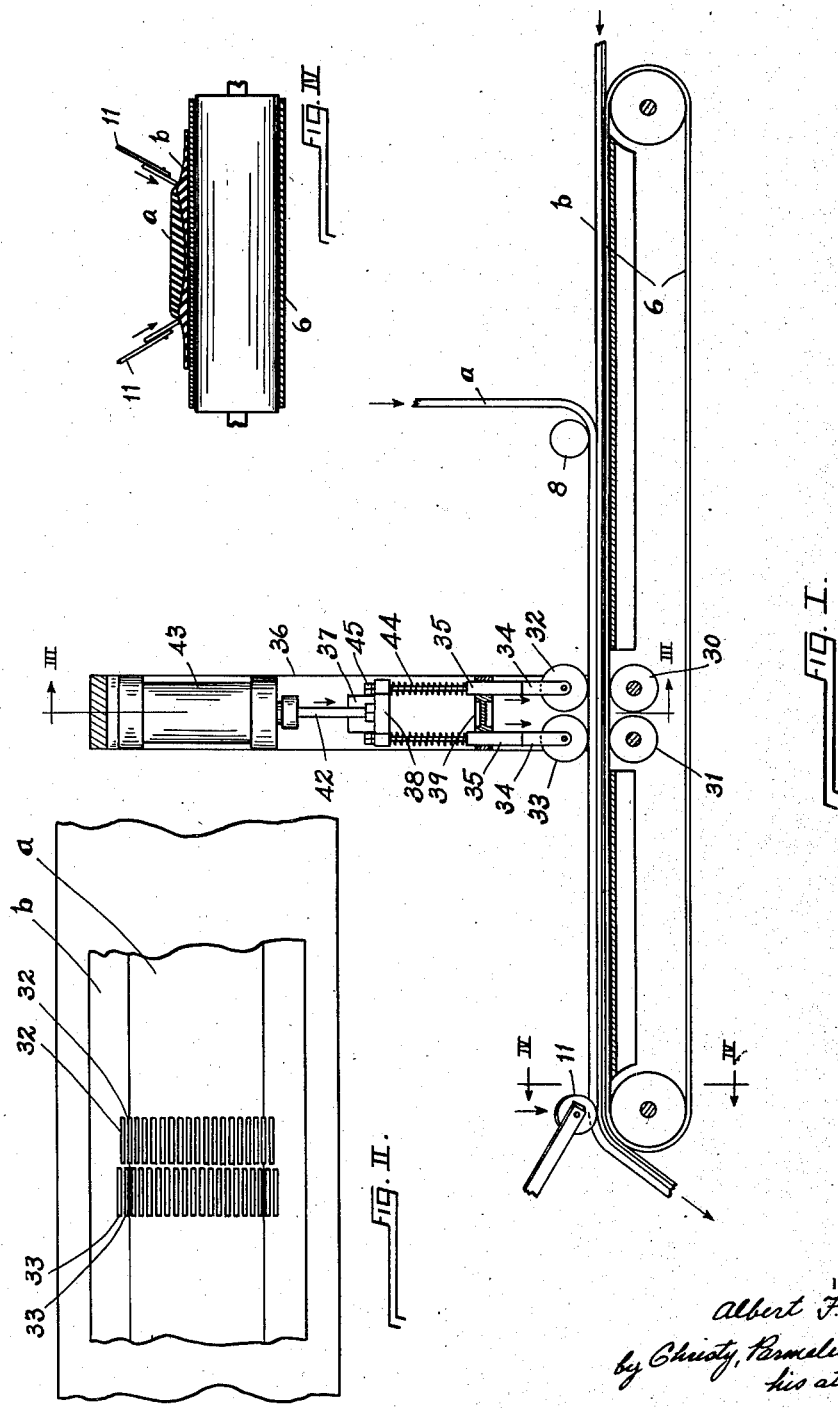
INVENTOR
Albert F. Larabee
by Christy, Parmelee & Strickland
his attorneys

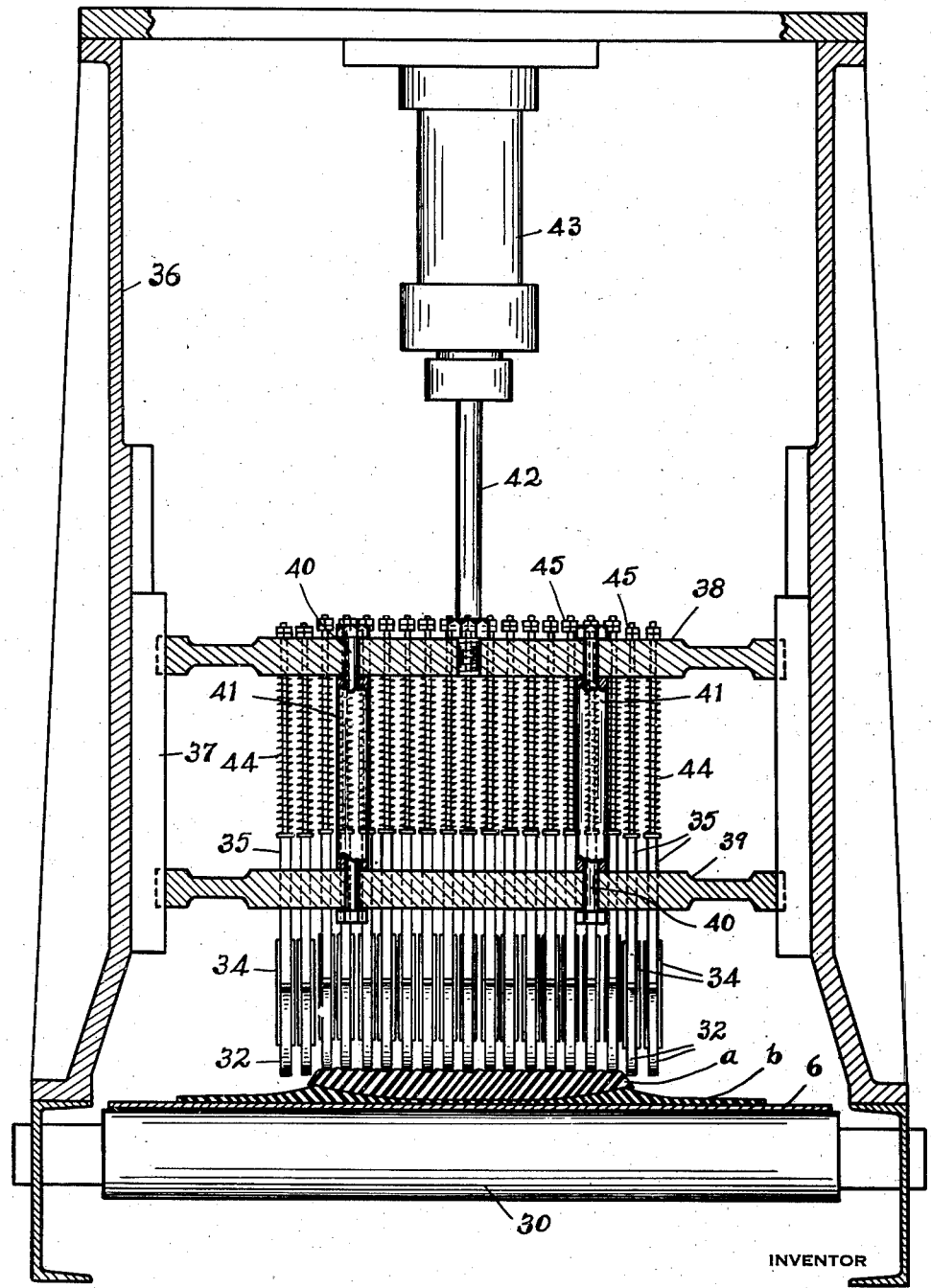
Fig. III.

Patented May 22, 1945

2,376,494

UNITED STATES PATENT OFFICE 2,376,494

TIRE MANUFACTURE

Albert F. Larabee, Jeannette, Pa., assignor to Pennsylvania Rubber Company, Borough of Jeannette, Pa., a corporation of Pennsylvania Application December 8, 1941, Serial No. 422,125

1 Claim. (Cl. 154—9)

This invention relates to the manufacture of pneumatic tires for vehicles, and specifically to the manufacture of drum-built tires.

In accordance with a prevailing practice, the tread and outer side walls of the outer shoe of a pneumatic tire (commonly termed, par excellence, a tire) are formed from a strip of raw rubber which, shaped to proper cross-section, is produced in relatively great and indefinite length. An appropriate shorter length cut from the strip is applied to, shaped to, and vulcanized into union with a fabric carcass to form the completed tire.

The rubber of which the tread portion of the tire is formed is desirably a relatively hard, wear-enduring rubber; while in the side walls of the tire the rubber is preferably of softer and more elastic character. On such account it is customary to form the strip mentioned above as a compound strip including two portions of differently compounded material. The medial, relatively narrow and thick body portion of the strip—the portion that ultimately forms the tread of the finished tire—is made of different composition than the marginal portions of the strip that in the finished tire provide the facing of the side walls.

In Letters Patent No. 2,230,072, granted January 28, 1941, on the application of Archibald C. Bowers, and in Letters Patent No. 2,218,751, granted October 22, 1940, on my own application, machinery is shown and described for shaping from two separate batches of rubber (differently compounded) the two strip parts, and for uniting them into a compound strip. It is with the uniting means that my present invention has to do. The object of invention is a union of such strip parts that shall be superior in intimacy and durability.

In the accompanying drawing Fig. I is a diagrammatic view in side elevation of a machine for uniting the preformed components of the strip in contemplation, in which machine the present invention is embodied; Fig. II is a fragmentary view of the machine in plan from above; Fig. III is a view to larger scale, showing the machine in vertical and transverse section, on the plane indicated at III—III, Fig. I; Fig. IV is a view in vertical and transverse section, on the plane indicated at IV—IV, Fig. I.

Two preformed components $a$ and $b$ of the ultimate strip are brought together beneath a roll 8 upon an endless conveyor 6. These components it will be understood have been formed of still unvulcanized and plastic rubber mixes of distinct and suitable composition, and have been shaped and prepared by suitable apparatus—typically by apparatus such as that described in the Letters Patent named above. Fig. II shows the assembly in plan, and Fig. III shows the strip as union of its components is being effected. To this figure corresponding letters $a$ and $b$ have been applied, and this showing will suffice to indicate that the component $b$ is relatively wide and the component $a$ relatively narrow. It may be understood that it is the component $a$ which eventually constitutes the tread portion of the tire and that it is of a composition such as to afford when vulcanized a relatively tough and wear-resistant portion; and it is the component $b$ which in its lateral extensions forms the faces of the side walls of the tire and that is of a composition such as to afford a relatively soft and pliant portion. The two parts $a$ and $b$, brought beneath roller 8 to the centrally aligned and superposed positions sufficiently indicated in Figs. II and III, advance upon the conveyor 6 in right-to-left direction to the uniting means in which my present invention is found.

The uniting means consist of two roll-passes. Each pass is formed by and between a nether roll 30, 31 having a continuous cylindrical face, and an upper roll member that is compound and formed of a plurality of spaced apart disks, 32, 33. The rolls 30, 31 and the disks 32, 33 alike are conveniently formed of steel, and are for all present purposes to be regarded as individually rigid and unyielding bodies. The unitary nether rolls 30, 31 are mounted to turn idly in stationary bearings; the disks 32, 33 that make up the compound upper roll members are, disk by disk, severally mounted to turn idly in forks 34 that extend from the lower ends of vertically extending and vertically movable stems 35.

A frame 36 is provided, bridging the path of advance of the work, and in this frame is formed a vertically extending slideway 37. A carriage is movable vertically in this slideway. It consists of two cross-heads 38 and 39 rigidly united by bolts 40 and spacer sleeves 41. The carriage is rigidly borne by the stem 42 that extends vertically downward from a piston within a power cylinder 43 rigidly mounted in frame 36.

Through orifices in the cross-heads 38 and 39 the disk-carrying stems 35 extend, and the stems are free to move vertically within the orifices. Rotative movement is prevented, conveniently by giving to the orifices in cross-head 39 rectangular shape, and by giving corresponding shape to the stems 35 throughout so much of their length as makes engagement in these orifices. Springs 44 yieldingly hold the stems 35 severally in downwardly extended position from the carriage, and enlargements upon the stems, conveniently in the form of adjustable nuts 45 engaging the upper cross-head 38 from above, limit the stems 35 severally in their range of downward extension. The disks 32, 33 of each set are mounted in normally co-axial assembly; and from downward extended position the disks severally will under stress recede vertically upward within the downwardly advanced carriage, and in their recession will, by virtue of their spring backing, exert pressure. That is to say, the roll-pass, defined below by the roll 30, 31, is defined above by a succession of spaced apart, individually yielding, spring-backed disks 32, 33.

The interval at which the disks of each set are spaced apart is constant and is slightly less than the breadth of the disks, which also is constant. In a particular machine built to meet actual conditions of production the barrel of roll 30 is 25 inches long and 3 inches in diameter; and the disks 32, 33 are 3 inches in diameter and 0.375 of an inch broad. Their faces are curved on a three-quarter-inch radius, and the corners are rounded. The spacing between the disks of each set (centre plane to centre plane) is $11/16$ (=0.688) of an inch, which distance, it will be seen, is slightly less than twice the width of the individual disk. The disks of the two sets are so arranged that the disks 33 of the second set come to bearing on the work, as it advances through the roll passes in the right-to-left course indicated, along paths that are intermediate between the paths of bearing of the disks 32 of the first set; and, because of the slight excess of disk width over the interval between disks, the paths of bearing of the disks of the two sets upon the work overlap slightly at the margins.

Referring particularly to Fig. III, the portion $b$ of the assembled blank advancing through the roll pass is shown to be engaged from beneath by the continuous face of roll 30, while the portion $a$ is engaged from above by the set of disks 32. It will be understood that, by proper adjustment of the piston within cylinder 43, the disks are held in downwardly advanced position; so that, while individually the disks may yield under their spring backing and so make accommodation to minor irregularities in the work, collectively the disks exert adequate pressure to effect the desired union. Manifestly such a set of disks lend itself to irregularity of work and effects minute distribution of the uniting stress, as an integral roll extending across the breadth of the work could not do. The set of disks is of such extent as to engage throughout its breadth the portion $a$ of the blank of greatest contemplated breadth; and the apparatus will serve upon blanks whose portion $a$ is narrower, as in Fig. III shown—the marginal disks 32 of the set being inactive merely.

Fig. II shows how, by arranging the disks of the two roll passes in staggered relative positions (the disks being wider, slightly, than the intervals between disks), the upper surface of the portion $a$ of the blank is, in the advance through the two roll passes, compressed over its entire extent. No pocketed or intercalated air is carried through the roll passes; the union of the meeting faces of the two portions of plastic, tacky, still incompletely vulcanized rubber is continuous and adequate; so that in the ultimately shaped and vulcanized tire the tread portion is integrated with the body of the tire in a union that is continuous and free of flaw or inequality.

In operation the components $a$ and $b$ of the blank are brought together beneath roller 8, Fig. I. The so assembled blank advances from right to left through the roll passes of the invention, defined by roll 30 and disks 32, roll 31 and disks 33, and in these two roll passes the integration of the components is completed throughout substantially all the breadth of portion $a$. The blank in its continued advance is subjected to the action of the pair of stitching rolls, that are arranged and that serve in the manner shown and described in the Bowers patent named above: they shape the very edge of the portion $a$ over the ridges that are formed in blank $b$, between which ridges the portion $a$ has been applied; and they carry to the very edge the compressive stress under which the portions $a$ and $b$ are united. Comparison of Figs. III and IV will make plain the successive action of disks 32, 33, and 11, and the effect thereof.

I claim as my invention:

In rubber-fabricating machinery, means for uniting superposed layers of plastic and adhesive rubber composition, including two roll passes arranged for the successive reception of advancing work, each pass defined by and between a roll upon one side having a continuous surface and a succession of spaced apart and individually yieldable disks upon the other side, the disks being of a width exceeding the intervals at which they are spaced apart, and the disks of the second roll pass being centered in assembly in the spaces between the disks of the first roll pass.

ALBERT F. LARABEE.